US010908362B1

(12) United States Patent
Janta-Polczynski (10) Patent No.: US 10,908,362 B1
(45) Date of Patent: Feb. 2, 2021

(54) INTERLACING BOOT FOR TWO-ROW FERRULE RIBBON FOR ONE DIMENSIONAL PHOTONIC CHIP BEACH FRONT

(71) Applicant: International Business Machines Corporation, Armonk, NY (US)

(72) Inventor: Barnim Alexander Janta-Polczynski, Shefford (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/654,272

(22) Filed: Oct. 16, 2019

(51) Int. Cl.
*G02B 6/36* (2006.01)
*G02B 6/38* (2006.01)

(52) U.S. Cl.
CPC ......... *G02B 6/3668* (2013.01); *G02B 6/3839* (2013.01); *G02B 6/3885* (2013.01); *G02B 6/368* (2013.01)

(58) Field of Classification Search
None
See application file for complete search history.

(56) References Cited

U.S. PATENT DOCUMENTS

| | | | |
|---|---|---|---|
| 5,024,505 A | 6/1991 | Fujikawa | |
| 5,367,595 A * | 11/1994 | Jennings | G02B 6/2804 385/59 |
| 5,905,835 A | 5/1999 | Bourghelle | |
| 5,915,055 A * | 6/1999 | Bennett | G02B 6/2551 385/100 |
| 6,045,269 A * | 4/2000 | Watanabe | G02B 6/29368 385/59 |
| 6,175,677 B1 | 1/2001 | Yang | |
| 6,299,361 B1 * | 10/2001 | Sasaki | G02B 6/3636 385/58 |

(Continued)

FOREIGN PATENT DOCUMENTS

| | | |
|---|---|---|
| FR | 2823859 A1 * | 10/2002 |
| JP | 2001-66466 A * | 3/2001 |
| WO | 2013150149 A1 | 10/2013 |

OTHER PUBLICATIONS

US Conec introduces EZ shuffle™ solution for high density fiber management: USCONEC; Oct. 17, 2018 (2 pages).

*Primary Examiner* — Michael Stahl
(74) *Attorney, Agent, or Firm* — Cantor Colburn LLP; Alvin Borromeo (57) ABSTRACT

Embodiments of the present invention are directed to an interlacing boot and methods of using the same to automatically interleave optical fibers in a two-row array, such from a two rows ferrule. In a non-limiting embodiment of the invention, the optical fibers are inserted into a first end of an interlacing boot in a first direction. The interlacing boot can include a guiding structure having one or more channels. Each channel can be adapted to receive a single optical fiber. Each channel can include a first end and a second end, and the second end can be offset with respect to the first end in a second direction orthogonal to the first direction. The interlacing boot can be pushed towards the ferrule to feed the optical fibers through the guiding structure. The first row of fibers can be physically offset from and interlaced with the second row of fibers by the guiding structure.

20 Claims, 9 Drawing Sheets

(56) References Cited

U.S. PATENT DOCUMENTS

| | | | |
|---|---|---|---|
| 6,345,916 B1* | 2/2002 | Yui | G02B 6/3652 |
| | | | 385/147 |
| 6,421,493 B1* | 7/2002 | Burek | G02B 6/3885 |
| | | | 385/134 |
| 6,430,348 B1 | 8/2002 | Asano | |
| 6,817,777 B1 | 11/2004 | Grabbe | |
| 6,848,870 B2 | 2/2005 | Grabbe | |
| 8,867,876 B2 | 10/2014 | Saravanos et al. | |
| 9,366,829 B2 | 6/2016 | Czosnowski et al. | |
| 9,507,099 B2 | 11/2016 | Li et al. | |
| 10,042,137 B2 | 8/2018 | Conrad et al. | |
| 2003/0031425 A1* | 2/2003 | Suematsu | G02B 6/3835 |
| | | | 385/78 |
| 2003/0044155 A1 | 3/2003 | Maiden | |
| 2003/0169995 A1* | 9/2003 | Song | G02B 6/368 |
| | | | 385/137 |
| 2003/0174971 A1* | 9/2003 | Shigenaga | G02B 6/3834 |
| | | | 385/71 |
| 2004/0161205 A1* | 8/2004 | Hengelmolen | G02B 6/3834 |
| | | | 385/78 |
| 2006/0245694 A1 | 11/2006 | Chen et al. | |
| 2011/0033159 A1* | 2/2011 | Kojima | G02B 6/4214 |
| | | | 385/79 |
| 2011/0198324 A1* | 8/2011 | de Jong | G02B 6/245 |
| | | | 219/121.72 |
| 2015/0059412 A1 | 3/2015 | Wonoadi | |
| 2018/0341080 A1 | 11/2018 | Conrad et al. | |
| 2019/0384026 A1* | 12/2019 | Bickham | G02B 6/4243 |

* cited by examiner

INTERLACING BOOT FOR TWO-ROW FERRULE RIBBON FOR ONE DIMENSIONAL PHOTONIC CHIP BEACH FRONT

BACKGROUND

The present invention relates generally to ribbons and multi-termination (MT) ferrule use in optical fiber connectors. More specifically, the present invention relates to an interlacing boot for a two-row fiber array from a ferrule for a one dimensional (1D) photonic chip beach front.

Fiber optic arrays or fiber optics ribbons (sometimes referred to herein simply as "ribbons" for convenience) are supplied with several individual optical fibers disposed parallel to one another. Each individual optical fiber includes a glass core and a glass cladding, both of which are protected in a polymeric coating, which can be color coded. A plurality of these individual optical fibers are impregnated in a polymeric ribbon matrix to form a fiber optic ribbon. Fiber optic ribbons are typically supplied as 2-fiber ribbons, 4-fiber ribbons, 8-fiber ribbons, 12-fiber ribbons and 16-fiber ribbons. An array of optical fibers can include multiple optical fibers placed parallel to each other, and can include fibers of various types, order, and mix.

Optical fiber connectors typically use a ferrule in which the optical fibers are terminated and secured. The multiple termination (MT) ferrule is one such ferrule commonly used in optical fiber applications where a fiber optic ribbon or optical fiber array are terminated into the ferrule connector. The MT ferrule is ubiquitous because it can accommodate a variety of different numbers of optical fibers and fiber optic ribbons. For example, an MT 24 ferrule can accommodate up to 24 optical fibers, while an MT 8 ferrule serves just eight fibers. Usually, the optical fibers are stacked in an array of one, two, or four rows and, as example in the case of an MT 24 ferrule, we have a layout of two rows of 12 fibers or equivalently twelve columns of two fibers.

SUMMARY

Embodiments of the invention are directed to an interlacing boot for optical fibers. A non-limiting example of the interlacing boot includes a body having a first end adapted for insertion over a ferrule with multiple rows of fibers arrays and a second end opposite the first end. The second end includes an opening. The body is tapered between the first end and the second end in a first direction. The interlacing boot further includes guiding structures disposed within the body. The guiding structures include one or more channels and each channel is adapted to receive a single optical fiber. Each channel includes a first end and a second end, and the second end is offset with respect to the first end in a second direction orthogonal to the first direction.

Embodiments of the invention are directed to a method for using an interlacing boot to automatically interleave optical fibers from a two-row fiber array. A non-limiting example of the method includes inserting the optical fibers into a first end of an interlacing boot in a first direction. The interlacing boot can include guiding structures having one or more channels. Each channel can be adapted to receive a single optical fiber. Each channel can include a first end and a second end, and the second end can be offset with respect to the first end in a second direction orthogonal to the first direction. The interlacing boot can be pushed along the arrays, or towards a multiple row ferrule, to feed the optical fibers through the guiding structure. The first row of fibers can be physically offset from and interlaced with the second row of fibers by the guiding structure.

Embodiments of the invention are directed to a method for using an interlacing boot to automatically interleave optical fibers from multiple ribbons. A non-limiting example of the method includes feeding the optical fibers into an interlacing comb in a first direction. The optical fibers include a first row of fibers and a second row of fibers. The interlacing comb includes a guiding structure having one or more channels. Each channel is adapted to receive a single optical fiber. Each channel includes a first end and a second end, and the second end is offset with respect to the first end in a second direction orthogonal to the first direction. The method includes moving the optical fibers through the interlacing comb to force the optical fibers through the guiding structure. The first row of fibers are physically offset from and interlaced with the second row of fibers by the guiding structure. The method includes inserting the optical fibers into a first end of an interlacing boot and removing the interlacing comb.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

It is understood in advance that although example embodiments of the invention are described in connection with a particular ferrule architecture example (e.g., a 2×12 ribbon to 24-fiber ferrule), embodiments of the invention are not limited to the particular ferrule architectures described in this specification. Rather, embodiments of the present invention are capable of being implemented in conjunction with any ribbon configuration (2-row, 3-row, N-row, etc.) having any arbitrary number of optical fibers (an even or odd number of fibers, a large number of fibers, few fibers, various mixes of fiber types such as high-NA or PM maintaining fibers, etc.).

Turning now to an overview of technologies that are more specifically relevant to aspects of the present invention, fiber optic connectors are being designed to handle higher numbers of optical fibers to provide for a larger number of optical communication channels. For example, while it is very common to have a fiber optic connector terminated with two, eight, or 12 individual optical fibers, but in some applications, it is more desirable to terminate a similar connector with 24, 32, 48, or even more optical fibers.

As used herein an "individual optical fiber" is one that has a glass core surrounded by a glass cladding, which is surrounded by a polymeric coating. That is, an individual optical fiber differs from a fiber optic ribbon in that the former does not contain any polymeric matrix to hold the single optical fibers together. As used herein, the term "exposed optical fibers" means that the polymeric matrix and the polymeric coating has been removed from the ribbon, thereby exposing the glass cladding.

Optical fiber connectors typically use a ferrule in which the individual fibers in a fiber optic ribbon or ribbons are terminated and secured. When multiple fiber optic ribbons and their associated individual fibers are manually installed into a ferrule, the process can be very time consuming in part due to the relatively small and rather delicate nature of the fiber optic ribbon. Manual installation is particularly difficult given the small dimensions involved, such as a typical 8-fiber ribbon being only about 2 mm wide and 0.32 mm thick, with each individual coated optical fiber therein being only 250 micrometers in diameter. This is even more true in applications that require axis alignments, such as when a PM fiber rotational alignment of the transverse axis is required to clock the PM inside the ferrule.

Some common practices for installing multiple ribbons into a ferrule, such as a guiding ferrule, is to install one ribbon at a time using a v-groove or ribbonization tool. The 24-fiber, multiple ribbon MT 24 ferrule, for example, has been designed with stepped rows of v-grooves inside the ferrule, each v-groove row functioning to guide and to accommodate a ribbon. As used herein, a "v-groove" refers to a groove having a generally v-shaped cross-sectional profile (sometimes referred to as teeth), typically positioned adjacent to an MT ferrule to increase fiber density. Usually, one installs the bottommost ribbon first, where the v-grooves are the longest, by aligning the fibers of the ribbon within the channel defined by the guiding v-grooves and then pushing the fibers into the connected fiber holes. One then installs a second ribbon in a second row of v-grooves that is slightly shorter than the first row. Because most ferrules have an opening on the top, an installer can visually watch the ribbons entering each row of v-grooves. While v-grooves allow for multiple ribbons to be installed into a single ferrule, interlacing is difficult and typically done manually. During installation, fibers are placed one by one at the proper location (or ribbon by ribbon, where ribbon lateral offset requires large distance for the bend). Such a process can be very time consuming and can produce a low yield.

Ribbonization tools, whereby multiple input fibers are recombined into ribbons, also struggle with interlacing, especially at high fiber densities. When using a ribbonization tool, multiple fibers are inserted (from an MT or fanout bloc, for example) one by one into predetermined locations in the ribbonization tool. Once the interlacing is manually assured, the ribbonization tool can be used to realign stacked fibers into a 1D configuration.

Consequently, while both v-grooves and ribbonization tools can ultimately provide 1D fiber configurations, neither approach is well-suited to complete automation, as both require manual intervention and careful fiber review before or during fiber interlacing. It would be highly advantageous to provide a ferrule assembly that can automatically handle arbitrary fiber density interlacing without introducing defects or optical fiber misalignments.

Turning now to an overview of aspects of the present invention, one or more embodiments of the invention address the above-described shortcomings of the prior art by providing a new interlacing boot for two-row ferrule ribbons that automatically interlaces fibers during insertion. This new interlacing boot contains one or more guiding structures that physically offset and interlace optical fibers as those fibers are moved through channels in the guiding structures during insertion.

Unlike conventional v-grooves, which run parallel to each other straight in the direction of fiber insertion, the present guiding structures can include channels that are constructed with arbitrary offset angles with respect to the path of insertion. As an optical fiber enters a channel in the guiding structure, the optical fiber will be guided through the channel and physically deflected by the channel's offset angle. The channels can be constructed such that each fiber enters a different channel and each fiber achieves any desired level of offset at any point along the channel's length.

The interlacing boot itself and/or channels in the guiding structure can be tapered such that each fiber is automatically and physically interleaved after sufficient offsetting has been achieved (at a point that can also be arbitrarily defined and based, for example, on the stress level of the fiber and tolerable bending radii for the given application). In short, an optical fiber enters a channel and is forced into an offset via the channel's path. The fiber is then forced into an interleaved position with respect to other fibers by the tapering of the interlacing boot (or by tapering of the guiding channels, or both). As this interlacing boot provides a mechanism to physically and automatically offset and interlace optical fibers, it is well-suited to high fiber count applications, such as high fiber density single row connections needed in silicon photonics optical connections, while still being compatibile with standard off-the-shelves MT components. Moreover, the custom nature of the channels allows for arbitrary changes in final fiber pitch. In some applications, the final fiber pitch can be larger or smaller than the initial pitch of either row of fibers. For example, when combining two rows of fibers the final pitch can be twice the original pitch (e.g., interleaving a top row into a bottom row), or more than twice the original pitch (e.g., interleaving both rows to reduce pitch between adjacent fibers), or less than twice the original pitch (e.g., the channel offsetting can increase the pitch between adjacent interleaved fibers).

Figure 1:
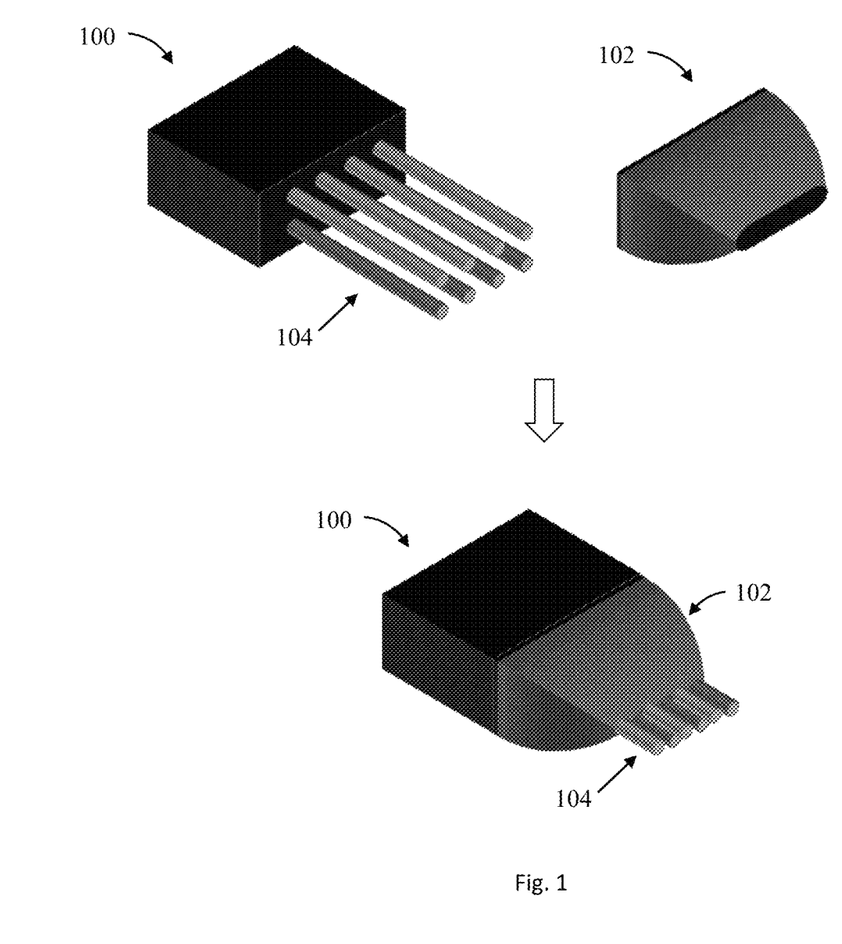
FIG. 1 depicts an isometric view of a two-row ferrule before and after insertion into an interlacing boot in accordance to one or more embodiments of the invention.

Turning now to a more detailed description of aspects of the present invention, FIG. 1 depicts an isometric view of a two-row ferrule 100 before (images above) and after (combined image below) insertion into an interlacing boot 102 according to one or more embodiments of the invention. As shown in FIG. 1, the two-row ferrule 100 includes two vertically stacked rows of optical fibers 104 (also referred to as a 2D array of fibers). While shown as having eight total fibers in a 2×4 configuration for ease of illustration, it is understood that the two-row ferrule 100 can include any number of vertically stacked optical fibers, as in a special custom made multi-row ferrule, or in an MT multi-row ferrule manufactured to industry standards. As an example, the two-row ferrule 100 can include 24 optical fibers arranged in a two-row of 12 configuration.

Figure 2A:
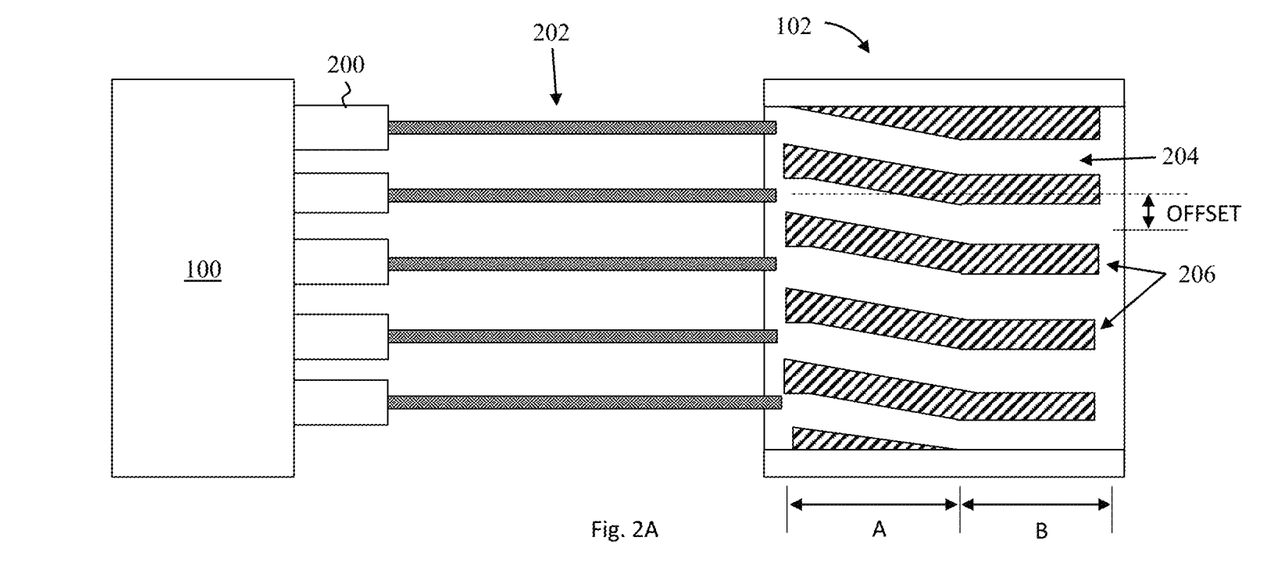
FIG. 2A depicts a top-down view of the two-row ferrule and the interlacing boot shown in FIG. 1 according to one or more embodiments of the invention.

During insertion into the interlacing boot 102, the optical fibers 104 are physically offset via channels constructed within the body of the interlacing boot 102 (see FIG. 2A). The optical fibers 104 are subsequently and/or concurrently interleaved via tapering in the channels or the body of the interlacing boot 102 (see FIG. 2B). After insertion, the optical fibers 104 leave the interlacing boot 102 as a single row of fibers (a 1D array of fibers) having twice the fiber density.

FIGS. 2A-6B depict the successive insertion of a two-row ferrule ribbon into an interlacing boot according to one or more embodiments of the invention. FIG. 2A depicts a top-down view of the two-row ferrule 100 and the interlacing boot 102 shown in FIG. 1. FIG. 2B depicts a cross-sectional view of the two-row ferrule 100 and the interlacing boot 102 shown in FIG. 1.

As shown in FIG. 2A, the two-row ferrule 100 can include an array of fiber optic ribbons 200. End portions of the fiber optic ribbons 200 can be removed or stripped of polymeric material to expose an array of single optical fibers 202. While not viewable in the top-down view shown in FIG. 2A (due to obstruction by the top row fibers), it can be easily seen in FIG. 2B that the array of optical fibers 202 includes two vertically stacked rows of fibers.

As further shown in FIG. 2A, the optical fibers 202 can be inserted into an opening in the interlacing boot 102. The interlacing boot 102 can include one or more channels 204 defined by a guiding structure 206. In some embodiments of the invention, the channels 204 are constructed such that only a single fiber of the optical fibers 202 can fit within a particular channel.

The channels 204 can be offset, either abruptly or gradually, from the axis of insertion. As shown, the channels 204 are gradually offset within a first portion "A" to a final degree of offsetting achieved within a second portion "B." In other embodiments of the invention, offsetting occurs along the entire length of the channels (i.e., "B" is small or nonexistent). While a single example of the portions "A" and "B" are shown for ease of illustration, it is understood that the length ratio between "A" and "B" can be arbitrarily set to achieve a given total offset over any arbitrary distance, depending on the needs of a given application.

In some embodiments of the invention, the guiding structure 206 is constructed such that only fibers from a single row of the two-row ferrule 100 enter channels (as shown, only the top fibers enter a channel). In this manner, only one of the rows of fibers will be offset within the channels (top or bottom rows, as desired). In other embodiments, the guiding structure 206 is constructed such that both rows of fibers enter channels (not shown for ease of illustration). In this manner, both rows of fibers are offset within the channels. In some embodiments of the invention, the top row is offset in a first direction while the bottom row is offset in a second direction. While increasing the complexity of the interlacing boot 102, allowing for simultaneous offsetting of both rows allows for the total offsetting distance to be reduced (halved if desired), and also enables a custom and specific final fiber pitch by offsetting the arrays accordingly.

Figure 2B:
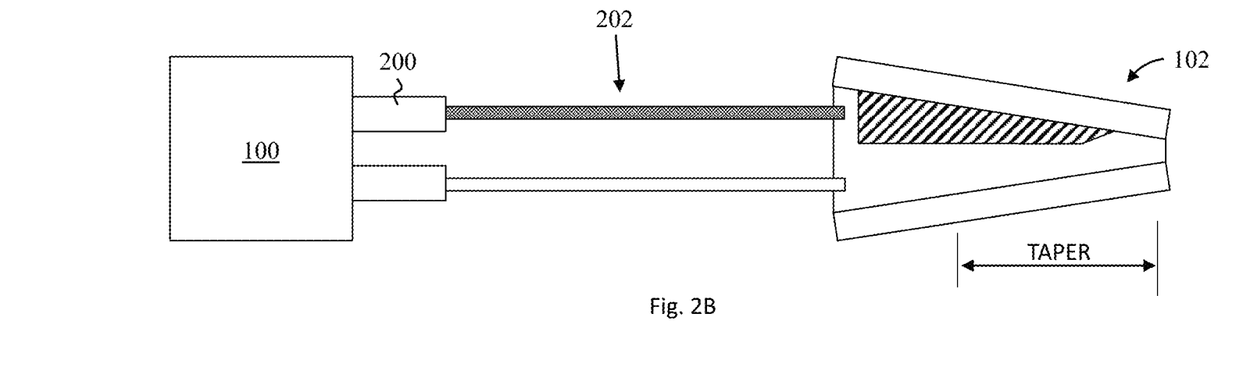
FIG. 2B depicts a cross-sectional view of the two-row ferrule and the interlacing boot shown in FIG. 1 according to one or more embodiments of the invention.

As shown in FIG. 2B, the interlacing boot 102 can be tapered to force the optical fibers 202 into a single row (a 1D array). Tapering can occur over the entirety (as shown) or over only a portion of the interlacing boot 102. In some embodiments of the invention, the interlacing boot 102 is constructed such that tapering occurs after offsetting (i.e., after the portion "A" shown in FIG. 2A). In some embodiments of the invention, the interlacing boot 102 is constructed such that tapering occurs after a portion, but not all, of the offsetting has occurred (i.e., some distance within portion "A" shown in FIG. 2A). Where this tapering distance occurs can be adjusted to ensure that sufficient offsetting of the fibers is achieved prior to interlacing, and can be based, for example, on the vertical distance between the two rows of fibers as well as on the pitch between adjacent fibers.

Figure 3A:
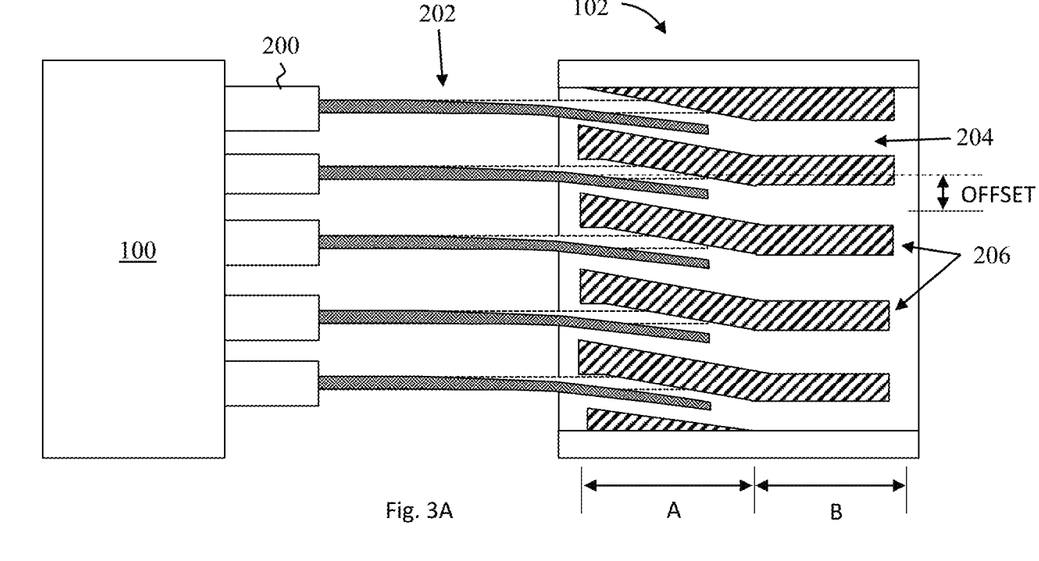
FIG. 3A depicts a top-down view of the two-row ferrule and the interlacing boot shown in FIG. 1 after the optical fibers have been guided partially through the interlacing boot according to one or more embodiments of the invention.
Figure 3B:
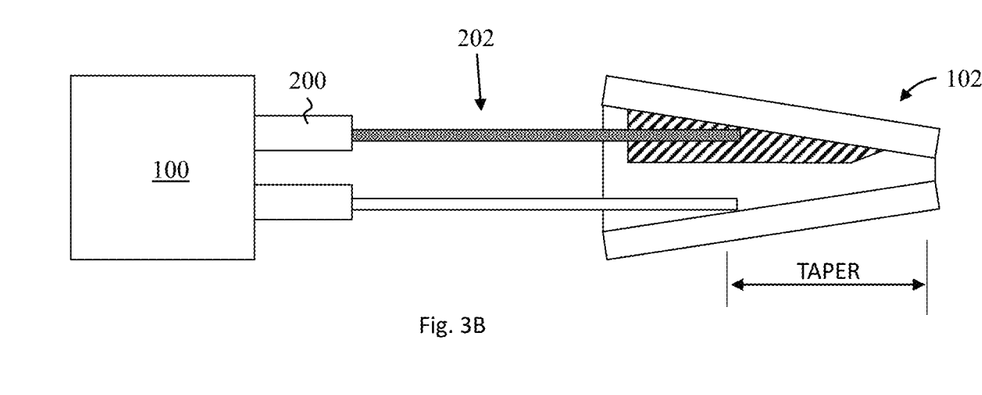
FIG. 3B depicts a cross-sectional view of the two-row ferrule and the interlacing boot shown in FIG. 1 after the optical fibers have been guided partially through the interlacing boot according to one or more embodiments of the invention.

FIG. 3A depicts a top-down view of the two-row ferrule 100 and the interlacing boot 102 shown in FIG. 1 as the optical fibers 202 have been guided along the channels 204 partially through the portion "A" of the interlacing boot 102. FIG. 3B depicts a cross-sectional view of the two-row ferrule 100 and the interlacing boot 102 shown in FIG. 1 as the optical fibers 202 have been guided along the channels 204 partially through the portion "A" of the interlacing boot 102.

As shown in FIG. 3B, only the top row fibers enter the guiding structure 206, resulting in a partial offset of the top row fibers (with respect to the bottom row fibers). As further shown in FIG. 3B, the bottom row fibers enter the interlacing boot 102 and continue under the guiding structure 206 (bypassing this structure) until hitting the tapered sidewall. In some embodiments of the invention, the bottom row fibers do not bypass the guiding structure 206, but instead enter a second portion of the guiding structure 206 (not shown). In this manner, both the top and bottom fibers can be offset and placed to a new interleaved output pitch as discussed previously.

In some embodiments of the invention, tapering can occur after partial or complete offsetting of the fibers. As shown in FIGS. 3A and 3B, the top row fibers have been partially offset by the time the fibers hit the tapered sidewall of the interlacing boot 102 (the "TAPER" section depicted in FIG. 3B). It is understood, however, that tapering can occur before, at any point during, or after offsetting of the optical fibers 202, by adjusting the sidewall construction of the interlacing boot 102.

Figure 4A:
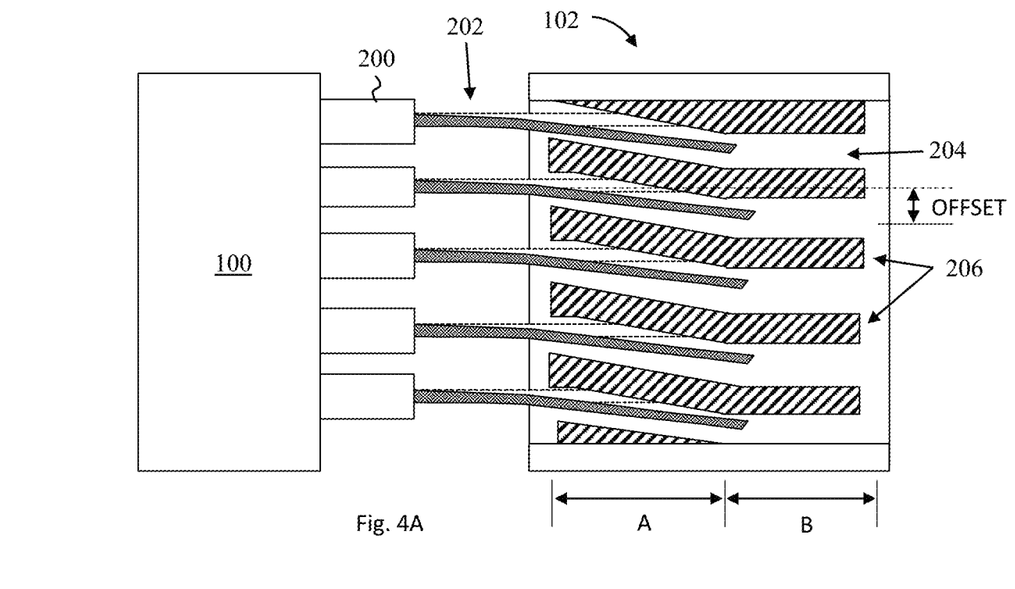
FIG. 4A depicts a top-down view of the two-row ferrule and the interlacing boot shown in FIG. 1 after the optical fibers have been guided through a first portion of the interlacing boot according to one or more embodiments of the invention.
Figure 4B:
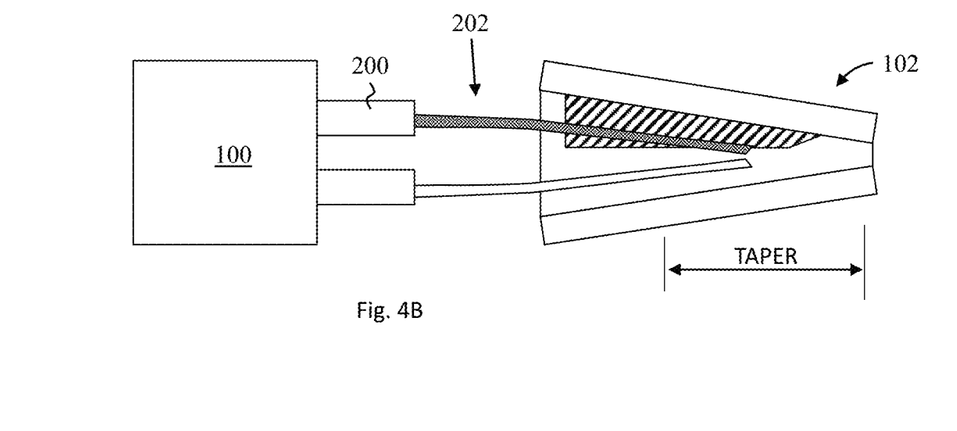
FIG. 4B depicts a cross-sectional view of the two-row ferrule and the interlacing boot shown in FIG. 1 after the optical fibers have been guided through a first portion of the interlacing boot according to one or more embodiments of the invention.

FIG. 4A depicts a top-down view of the two-row ferrule 100 and the interlacing boot 102 shown in FIG. 1 as the optical fibers 202 have been guided along the channels 204 through the portion "A" and into the portion "B" of the interlacing boot 102. FIG. 4B depicts a cross-sectional view of the two-row ferrule 100 and the interlacing boot 102 shown in FIG. 1 as the optical fibers 202 have been guided along the channels 204 through the portion "A" and into the portion "B" of the interlacing boot 102.

As shown in FIG. 4A, the interlacing boot 102 has been sufficiently inserted over the optical fibers 202 such that the top row fibers have been fully offset from the bottom row fibers. In other words, the optical fibers 202 have entered the portion "B" of the interlacing boot 102. As shown in FIG. 4B, the optical fibers 202 have hit the tapered sidewall of the interlacing boot 102. As a result, the optical fibers 202 have been forced toward each other in the vertical direction (the direction in which the two rows of fibers have been vertically stacked). As appreciated by comparing FIGS. 4A and 4B, tapering of the optical fibers 202 occurs after the top row has been at least partially offset from the bottom row. In this manner, collisions (and thus damage) between the top row and bottom row fibers is avoided.

Figure 5A:
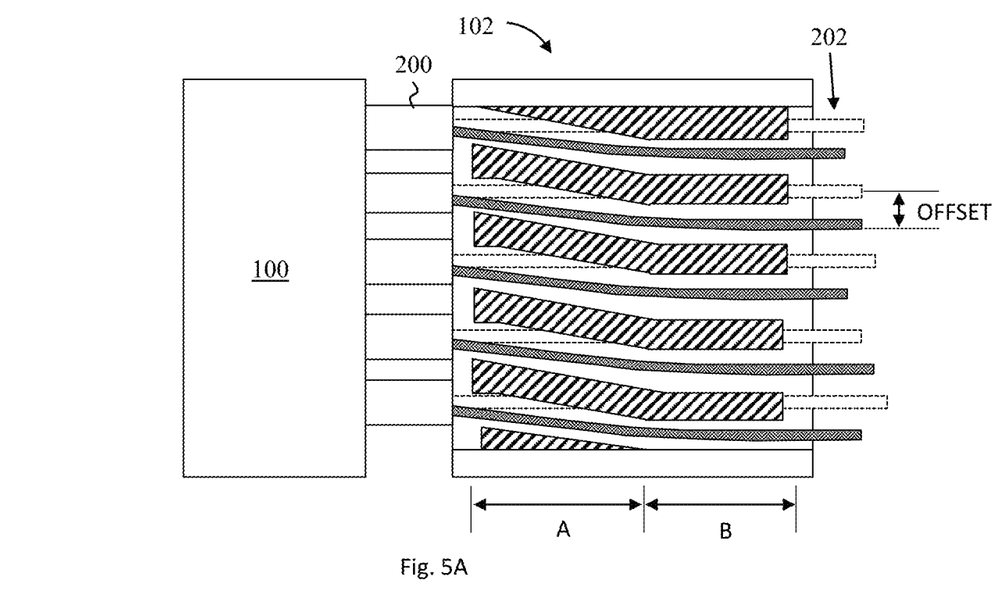
FIG. 5A depicts a top-down view of the two-row ferrule and the interlacing boot shown in FIG. 1 after the optical fibers have been guided through the interlacing boot according to one or more embodiments of the invention.
Figure 5B:
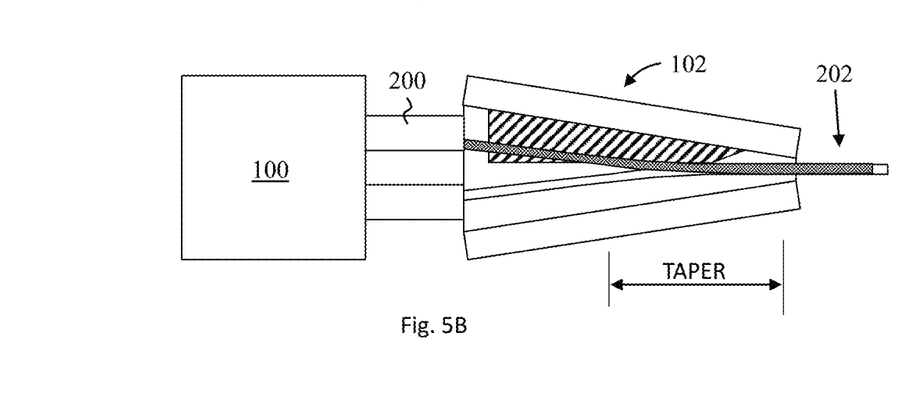
FIG. 5B depicts a cross-sectional view of the two-row ferrule and the interlacing boot shown in FIG. 1 after the optical fibers have been guided through the interlacing boot according to one or more embodiments of the invention.

FIG. 5A depicts a top-down view of the two-row ferrule 100 and the interlacing boot 102 shown in FIG. 1 as the optical fibers 202 have been guided through the channels 204 of the interlacing boot 102. FIG. 5B depicts a cross-sectional view of the two-row ferrule 100 and the interlacing boot 102 shown in FIG. 1 as the optical fibers 202 have been guided through the channels 204 of the interlacing boot 102.

As shown in FIG. 5A, the interlacing boot 102 has been sufficiently inserted over the optical fibers 202 such that end portions of the optical fibers 202 exit the interlacing boot 102. At this point, the optical fibers 202 have been offset and interleaved into a single row of fibers (a 1D array of fibers). In some embodiments of the invention, the length at which each of the end portions of the optical fibers 202 extend from the interlacing boot 102 varies (due to differences in fiber length, pathing through the guiding structure 206, etc.).

Figure 6A:
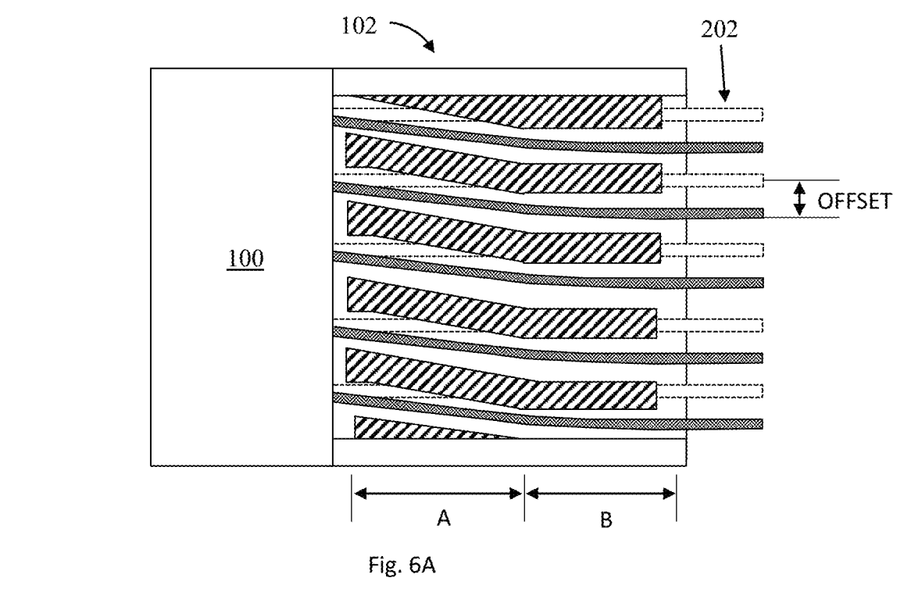
FIG. 6A depicts a top-down view of the two-row ferrule and the interlacing boot shown in FIG. 1 after the interlacing boot has been pushed over the fiber optic ribbons to the base of the two-row ferrule according to one or more embodiments of the invention.
Figure 6B:
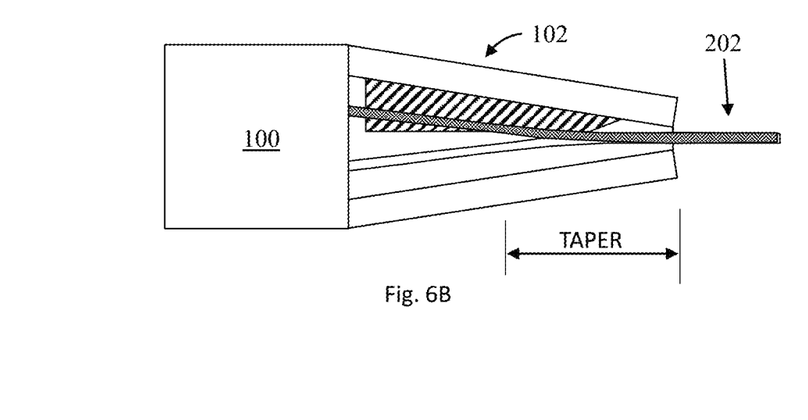
FIG. 6B depicts a cross-sectional view of the two-row ferrule and the interlacing boot shown in FIG. 1 after the interlacing boot has been pushed over the fiber optic ribbons to the base of the two-row ferrule according to one or more embodiments of the invention.

FIG. 6A depicts a top-down view of the two-row ferrule 100 and the interlacing boot 102 shown in FIG. 1 as the interlacing boot 102 has been pushed over the fiber optic ribbons 200 to the base of the two-row ferrule 100. FIG. 6B depicts a cross-sectional view of the two-row ferrule 100 and the interlacing boot 102 shown in FIG. 1 as the interlacing boot 102 has been pushed over the fiber optic ribbons 200 to the base of the two-row ferrule 100.

As shown in FIG. 6A, the interlacing boot 102 has been sufficiently inserted over the optical fibers 202 such that the fiber optic ribbons 200 have been completely covered. In some embodiments of the invention, the exposed end portions of the optical fibers 202 are cleaved to ensure that all fibers have the same exiting tip length (as discussed previously, some fibers can have shorter or longer fiber tip ends existing the interlacing boot 102 due to various factors, such as some fibers being offset while others are not-offset fibers will generally have shorter fiber tip ends). The optical fibers 202 can be cleaned and cleaved using any suitable process, such as via a laser or mechanical cleave. Cleaving is also useful for removing end portions of the optical fibers 202 that were damaged during the realignment process. In some embodiments of the invention, the interlacing boot 102 is then fixed to the two-row ferrule 100 to secure the fiber bends. In some embodiments of the invention, the interlacing boot 102 is glued with adhesive to the two-row ferrule 100, although other techniques for bonding the interlacing boot 102 to the two-row ferrule 100 or to the fiber arrays are within the contemplated scope of the invention. In some embodiments of the invention, the interlacing boot 102 includes a latch (not shown) for latching onto the two-row ferrule 100. In other embodiments of the invention, the interlacing boot is secured directly to the multiple fiber arrays (not shown). In this manner, the interlacing boot can be used even in applications that do not have a ferrule.

Figure 7:
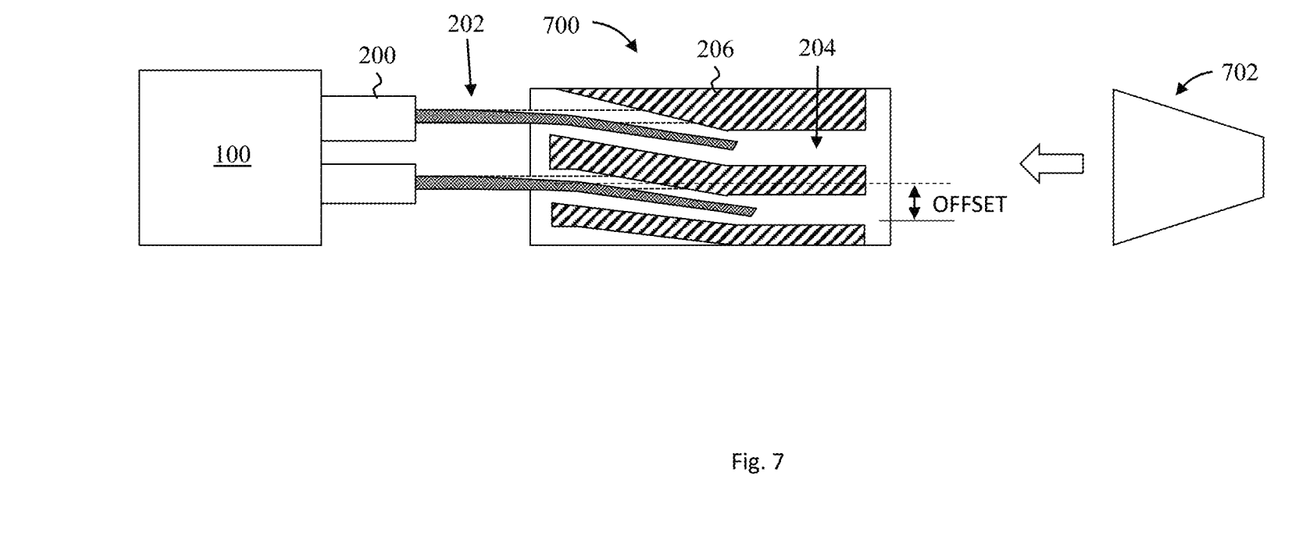
FIG. 7 depicts a cross-sectional view of a two-row ferrule being inserted into a temporary interlacing comb according to one or more embodiments of the invention.

FIG. 7 depicts a cross-sectional view of the two-row ferrule 100 being inserted into a temporary interlacing comb 700 according to one or more embodiments of the invention. As shown in FIG. 7, the guiding structure 206 discussed previously herein need not be confined to the interlacing boot 102. In some embodiments of the invention, the guiding structure 206 is instead housed within a temporary interlacing comb 700.

The optical fibers 202 are offset and interlaced using the interlacing comb 700 in a similar manner as previously described with respect to the interlacing boot 102. For example, the optical fibers 202 can be fed through the guiding structure 206 within the interlacing comb 700 to physically offset and interleave the optical fibers 202.

Advantageously, once the optical fibers 202 are interleaved into a single row of fibers a boot 702 can be inserted over the optical fibers 202 and the interlacing comb 700 can be removed. The boot 702 can then be fixed to the two-row ferrule 100 and the optical fibers 202 can be cleaved in a similar manner as discussed previously herein with respect to FIGS. 6A and 6B.

Placing the guiding structure 206 within a temporary interlacing comb 700 allows for the guiding structure 206 to be reused as many times as needed. The tradeoff, of course, is the increased cost in forming the interlacing comb 700 in addition to the boot 702. In short, a temporary interlacing boot is well-suited to repeatable applications, such as fiber runs having many ferrules of the same pitch (so that the same guiding structure 206 will work for each ferrule).

Figure 8:
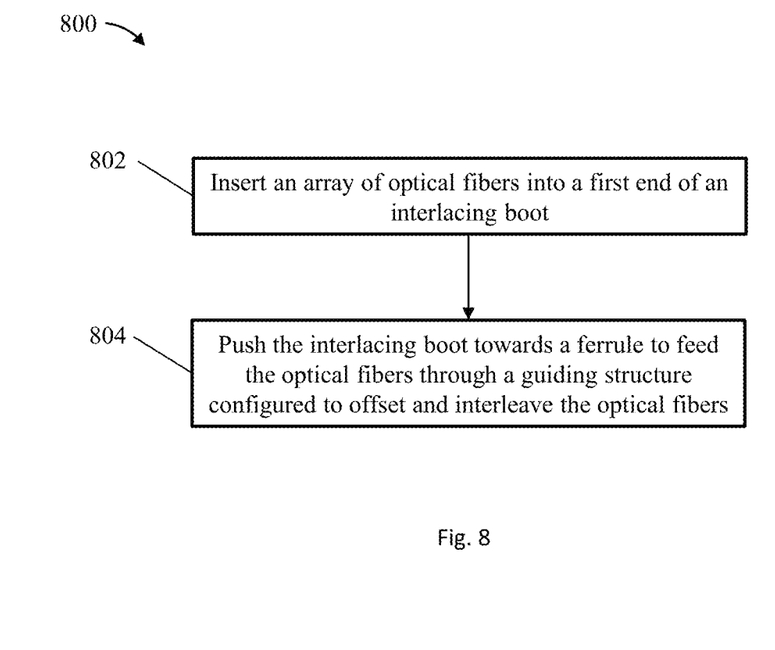
FIG. 8 depicts a flow diagram illustrating a method according to one or more embodiments of the invention.

FIG. 8 depicts a flow diagram 800 illustrating a method for interleaving an array of optical fibers in a ferrule according to one or more embodiments of the invention. As shown at block 802, the optical fibers are inserted into a first end of an interlacing boot. In some embodiments of the invention, the optical fibers include a first row of fibers and a second row of fibers.

In some embodiments of the invention, the interlacing boot includes a body having the first end adapted for insertion over a ferrule ribbon and a second end opposite the first end. The second end can include an opening. In some embodiments of the invention, the body is tapered between the first end and the second end in a first direction.

In some embodiments of the invention, a guiding structure is disposed within the body. The guiding structure can include one or more channels and each channel can be adapted to receive a single optical fiber. In some embodiments of the invention, each channel includes a first end and a second end and the second end is offset with respect to the first end in a second direction orthogonal to the first direction.

In some embodiments of the invention, the guiding structure is adapted to receive optical fibers from only a first row of a two-row ferrule. In some embodiments of the invention, the guiding structure is adapted such that a second row of the two-row ferrule bypasses the guiding structure. In some embodiments of the invention, the guiding structure is adapted to receive optical fibers from both rows of a two-row ferrule. In some embodiments of the invention, the guiding structure comprises one or more top channels and one or more bottom channels. In some embodiments of the invention, the guiding structure is adapted to ensure that the maximum fiber bend during offsetting is within allowable fiber bend radii for the given application. In some embodiments of the invention, the allowable fiber bend radii is predetermined based on a given application or fiber type.

In some embodiments of the invention, each channel in the guiding structure includes a first portion and a second portion. In some embodiments of the invention, the offset of each channel occurs within the first portion but not the second portion. In some embodiments of the invention, the offset of each channel occurs within the first portion and the second portion. In some embodiments of the invention, a majority of the offset of each channel occurs within the first portion (with a minority of the total offset occurring in the second portion).

In some embodiments of the invention, each channel is tapered. In some embodiments of the invention, tapering of each channel occurs within the second portion but not the first portion.

At block 804, the interlacing boot is pushed towards the ferrule to feed the optical fibers through the guiding structure. In some embodiments of the invention, the first row of fibers are physically offset from and interlaced with the second row of fibers by the guiding structure. Advantageously, even if the offsetting is not perfect initially (with regards to tolerance and the incoming pitch variation of the fiber array), the very nature of cylindrical fibers means that each fiber will interact by contact when they are tapered to complete the interleaving offset.

The method can further include coupling the interlacing boot to the ferrule. In some embodiments of the invention, the interlacing boot is glued to the ferrule using an adhesive. In some embodiments of the invention, the interlacing boot is latched onto the ferrule using a latch built into the interlacing boot or into the ferrule. In some embodiments of the invention, the optical fibers are cleaned and cleaved after feeding the optical fibers through the guiding structure (as otherwise they may protrude from the interlacing boot at different distances).

In some embodiments of the invention, a fiber tip from one or more optical fibers is cleaved. In some embodiments of the invention, cleaving the fiber tip(s) includes a laser or mechanical cleave. In some embodiments of the invention, the one or more optical fibers are cleaved such that each of the one or more optical fibers protrude a same length from the interlacing boot.

Figure 9:
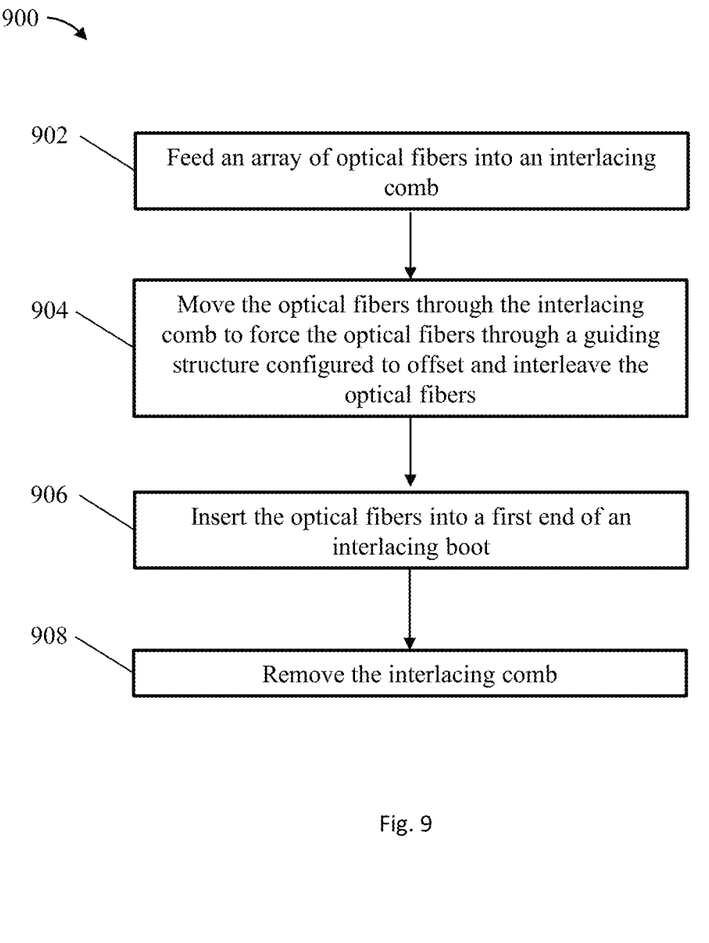
FIG. 9 depicts a flow diagram illustrating a method according to one or more embodiments of the invention.

FIG. 9 depicts a flow diagram 900 illustrating a method for interleaving an array of optical fibers in a ferrule according to one or more embodiments of the invention. As shown at block 902, the optical fibers are fed into an interlacing comb in a first direction. In some embodiments of the invention, the optical fibers include a first row of fibers and a second row of fibers.

In some embodiments of the invention, the interlacing comb includes a guiding structure. In some embodiments of the invention, the guiding structure includes one or more channels and each channel is adapted to receive a single optical fiber. In some embodiments of the invention, each channel includes a first end and a second end and the second end is offset with respect to the first end in a second direction orthogonal to the first direction.

At block 904, the optical fibers are moved (guided) through the interlacing comb to force the optical fibers through the guiding structure. In some embodiments of the invention, the first row of fibers is physically offset from and interlaced with the second row of fibers by the guiding structure. The optical fibers can be guiding through the guiding structure by physically moving the fibers into the interlacing comb, by moving the interlacing comb over the fibers, or by a combination of opposed fiber and comb movements. In some embodiments of the invention, the interlacing comb is divided into multiple moving portions (not shown), and each can be inserted around the top and bottom row fiber arrays. The offsetting of the top and bottom row of the fiber arrays can then be performed by moving the various portions to successively displace the fiber array to a given offset and pitch prior to inserting the interlacing boot.

At block 906, the optical fibers are inserted into an interlacing boot. The interlacing boot can include a body having a first end adapted for insertion over a ferrule ribbon and a second end opposite the first end. The second end can include an opening. In some embodiments of the invention, the body is tapered between the first end and the second end in a first direction. At block 908, the interlacing comb is removed.

The method can further include moving the interlacing boot over the optical fibers until contact is made with the ferrule. In this manner, the optical fibers are forced through and out of the interlacing boot. In some embodiments of the invention, the interlacing boot is glued to the ferrule using an adhesive. In some embodiments of the invention, one or more optical fibers are cleaved such that each of the optical fibers protrude a same length from the interlacing boot.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describes having a communications path between two elements and does not imply a direct connection between the elements with no intervening elements/ connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, are used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (e.g., rotated 90 degrees or at other orientations), and the spatially relative descriptors used herein should be interpreted accordingly.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An interlacing boot for a multiple fiber array, the interlacing boot comprising:
    a body having a first end adapted for insertion over the multiple fiber array and a second end opposite the first end, the second end comprising an opening, the body tapered between the first end and the second end in a first direction; and
    a guiding structure disposed within the body, the guiding structure comprising one or more channels, each channel adapted to receive a single optical fiber, each channel having a first end and a second end, wherein the second end is offset with respect to the first end in a second direction orthogonal to the first direction;
    wherein the guiding structure is adapted to receive a first row of fibers and a second row of fibers, wherein each fiber of the first row of fibers is vertically stacked over a fiber of the second row of fibers, and wherein the guiding structure is adapted to physically offset the first row of fibers in a same direction.

2. The interlacing boot of claim 1, wherein each channel comprises a first portion and a second portion.

3. The interlacing boot of claim 2, wherein the offset of each channel occurs within the first portion but not the second portion.

4. The interlacing boot of claim 2, wherein the offset of each channel occurs within the first portion and the second portion.

5. The interlacing boot of claim 2, wherein each channel is tapered.

6. The interlacing boot of claim 5, wherein tapering of each channel occurs within the second portion but not the first portion.

7. The interlacing boot of claim 1, wherein the guiding structure is adapted to receive optical fibers at a first pitch and interleave the optical fibers at a second pitch that is greater than or less than the first pitch.

8. The interlacing boot of claim 1, wherein the multiple fiber array terminates from a multi-row multi-termination (MT) ferrule.

9. The interlacing boot of claim 1, wherein the guiding structure is adapted to receive optical fibers from both rows of a two-row ferrule.

10. The interlacing boot of claim 9, wherein the guiding structure comprises one or more top channels and one or more bottom channels.

11. A method for interlacing arrays of optical fibers coming out from a multiple row ferrule, the method comprising:
    inserting the arrays of optical fibers into a first end of an interlacing boot, the arrays of optical fibers comprising a first row of fibers and a second row of fibers, the interlacing boot comprising:
        a body having the first end adapted for insertion over a ferrule ribbon and a second end opposite the first end, the second end comprising an opening, the body tapered between the first end and the second end in a first direction; and
        a guiding structure disposed within the body, the guiding structure comprising one or more channels, each channel adapted to receive a single optical fiber, each channel having a first end and a second end, wherein the second end is offset with respect to the first end in a second direction orthogonal to the first direction; and
    pushing the interlacing boot towards the ferrule to feed the optical fibers through the guiding structure;
    wherein the first row of fibers are physically offset from and interlaced with the second row of fibers by the guiding structure.

12. The method of claim 11 further comprising coupling the interlacing boot to the multiple row ferrule.

13. The method of claim 11, wherein the guiding structure is configured such that a maximum bending of any fiber within the guiding structure is within an allowable fiber bend radii.

14. The method of claim 11 further comprising cleaving a fiber tip from one or more optical fibers.

15. The method of claim 14, wherein cleaving the fiber tip comprises a laser or mechanical cleave.

16. The method of claim 15, wherein the one or more optical fibers are cleaved such that each of the one or more optical fibers protrude a same length from the interlacing boot.

17. A method for interlacing arrays of optical fibers from multiple ribbons, the method comprising:
    feeding the optical fibers into an interlacing comb in a first direction, the optical fibers comprising a first row of fibers and a second row of fibers, the interlacing comb comprising:
        a guiding structure comprising one or more channels, each channel adapted to receive a single optical fiber, each channel having a first end and a second end, wherein the second end is offset with respect to the first end in a second direction orthogonal to the first direction;
    moving the interlacing comb to force the optical fibers through the guiding structure, wherein the first row of fibers is physically offset from and interlaced with the second row of fibers by moving through the guiding structure;
    inserting the optical fibers into a first end of an interlacing boot comprising a body having the first end and a second end opposite the first end, the second end comprising an opening, the body tapered between the first end and the second end in a first direction; and
    removing the interlacing comb.

18. The method of claim 17 further comprising moving the interlacing boot over the optical fibers until contact is made with a multiple ribbon ferrule.

19. The method of claim 18, wherein the interlacing boot is glued to the ferrule using an adhesive.

20. The method of claim 19, wherein one or more optical fibers are cleaved such that each of the optical fibers protrude a same length from the interlacing boot.

* * * * *